(No Model.)
E. HAYES.
REGULATOR.
No. 477,253. Patented June 21, 1892.
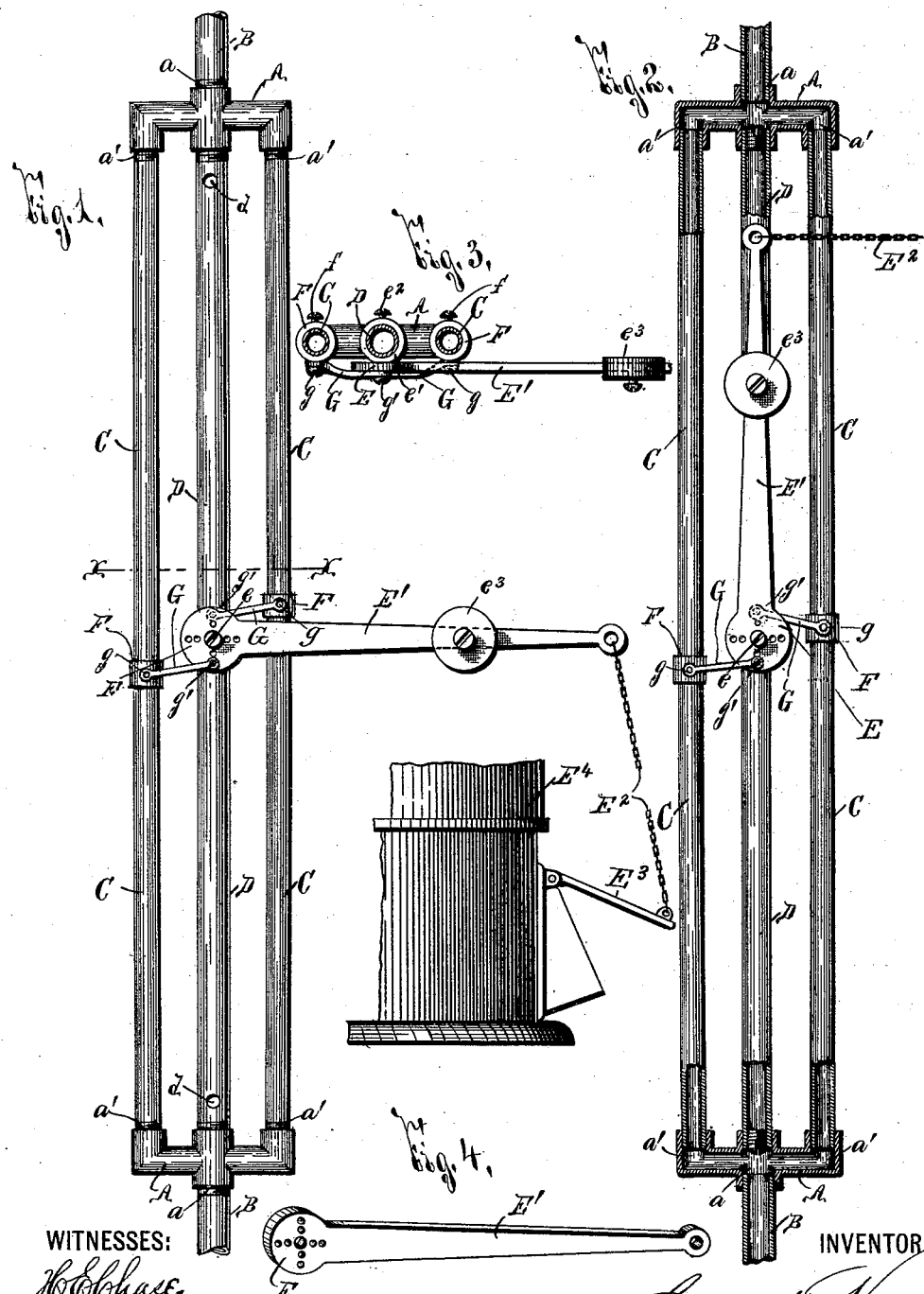
WITNESSES:
H. C. Chase,
W. H. Randall
INVENTOR
Edward Hayes
BY
Hay Williams & Parsons
ATTORNEYS,
THE NORRIS PETERS CO., PHOTO-LITHO., WASHINGTON, D. C.

UNITED STATES PATENT OFFICE.

EDWARD HAYES, OF ROCHESTER, NEW YORK.

REGULATOR.

SPECIFICATION forming part of Letters Patent No. 477,253, dated June 21, 1892.

Application filed November 10, 1891. Serial No. 411,502. (No model.)

*To all whom it may concern:*

Be it known that I, EDWARD HAYES, of Rochester, in the county of Monroe in the State of New York, have invented new and useful Improvements in Regulators, of which the following, taken in connection with the accompanying drawings, is a full, clear, and exact description.

My invention relates to improvements in regulators particularly applicable for use in fluid-heating systems, as steam, hot-air, or hot-water systems, and has for its object the production of a simple and effective device whereby the draft of the generator for increasing the temperature of the fluid is automatically controlled by the temperature of the circulating fluid; and to this end it consists, essentially, in a pipe connected in the heating system and so arranged as to expand laterally as the temperature of the fluid varies, a substantially rigid support in proximity to the regulating-pipe, a movable plate mounted on said support, and a connection between said plate and the movable pipe.
The invention furthermore consists in the detail construction and arrangement of the parts, all as hereinafter more particularly described, and pointed out in the claims.

In describing this invention reference is had to the accompanying drawings, forming a part of this specification, in which like letters indicate corresponding parts in all the views.

Figure 1 represents an elevation of my improved regulator. Fig. 2 is a similar elevation, partly in section, showing the movable plate as extending vertically instead of horizontally. Fig. 3 is a sectional view taken on line *x x*, Fig. 1; and Fig. 4 is an isometric perspective of the movable plate.
I am aware that it has been attempted to regulate heating systems by utilizing the variation in the temperature of the circulating fluid passed through the systems to control devices connected to the draft-door of the generator connected in the heating system for raising the temperature of the heating fluid. It has been my experience, however, in the practical use of such regulators, and particularly those intended for hot-water heating, that in most constructions only excessive variations in the temperature of the fluid are sufficient to operate the regulator and that in the remaining constructions the parts are made so fragile for the purpose of producing sensitiveness that the device is rendered ineffective and quickly worn out when subjected to excessive variation in the temperature of the fluid or to continued use.

By my invention I have sought to produce a device which may be readily and cheaply connected to any system and is equally applicable for steam, hot-water, or hot air; is extremely sensitive, so as to vary the draft with the slightest variation in the temperature of the fluid, and is so strong and durable as to last during the entire life-time of the system.

A A represent suitable supports or heads having a central passage *a*, connected to the heating system B, only a portion of which is here illustrated, and lateral passages *a' a'*, extending from the central passage *a*.

C C are the flexible pipes of my regulator, having their opposite ends connected to the laterally-extending passages *a' a'* of the supports or heads A, whereby the heating fluid passes from one head to the other through said pipes C C, and thence onwardly throughout the heating system. These heads A are firmly held in any desired manner, and it will be evident that as the temperature of the fluid varies the central portion of the pipes C C, which are constructed of brass or other sensitive but strong material, are free to move laterally, or, in other words, bow outwardly or inwardly, that the pipes C C may bow outwardly instead of inwardly. When heated, they are so formed and supported at their ends as to normally bow outwardly a slight degree, as clearly seen at Figs. 1 and 2. The supports or heads A are preferably held in position by means of a support D, having its opposite ends rigidly secured to said heads. For the purpose of lightness this support D also consists of a pipe, and in order to prevent the passage of the fluid thereinto its ends, as shown at Fig. 2, are plugged and provided with openings *d*, whereby a current of air passes lengthwise through the pipe, thus rendering its temperature normal and preventing its expansion and contraction.

E is a movable plate pivoted or movably mounted at its central portion upon the support D, being preferably secured thereto by a pivotal screw $e$, passed through a collar $e'$, secured by a pin $e^2$ to the support D.

Extending laterally from the plate E is an arm E', adapted to receive a weight $e^3$, adjustable thereon, and a regulating-chain $E^2$, connected in the usual manner to the draft-door $E^3$ of any suitable generator $E^4$, a portion of which is shown at Fig. 1, whereby as the arm E' is raised or lowered the door $E^3$ is also raised or lowered and the combustion of the generator accelerated or checked.

Upon the central portion of the pipes C C are collars F, which slide loosely thereon in order that they may be adjusted to the required position and are secured firmly when adjusted by means of screws $f$, Fig. 3. Hinged at $g$ to said collars and at $g'$ to the plate E are links G, whereby the lateral movement of the pipes is transmitted to the plate E for rocking the same on its pivot, and thus varying the position of the draft-door by raising or lowering the arm E'.

In practice I prefer to make the pipes C C of my regulator from six to eight feet long, that they may have the desired lateral movement to render the device extremely sensitive, and, as in some heating systems it is not convenient for these pipes to extend vertically and the arms E' of the plate E to extend perpendicular therewith, the pipes C C may be arranged horizontally and the plate E and its arm E' in a parallel plane, as shown at Fig. 2.

When starting the generator, the parts of the regulator are disposed in their normal position, as shown at Fig. 1, and the draft-door $E^3$ is then partially open, as seen at Fig. 1, and, as by the operation of the generator the temperature of the circulating fluid passed through the pipes C C is raised, said pipes are caused to bow outwardly by the increase in temperature and through the medium of the links G G rock the plate E on its pivot $e$, so as to depress the arm E' and also the generator-door for decreasing the draft. Should the temperature of the circulating fluid then fall, the return movement of the pipes C C rocks the plate E, so as to elevate the arm E', and thus elevates the door for accelerating the draft. As the regulator is extremely sensitive, the door is constantly varied slightly and the temperature of the circulating fluid caused to remain substantially uniform after the parts are regulated to the desired adjustment.

It is evident that as my regulator is composed of piping sufficiently long to afford the desired movement to regulate the generator there is no substantial strain upon the fluid-conducting pipes of the regulator and that as these parts are strong and durable the regulator is effective and will last equally as long as the other pipes composing the heating system.

The operation of my regulator will be readily perceived from the foregoing description and upon reference to the drawings, and it is evident that considerable change may be made in the detail construction and arrangement thereof without departing from the spirit of my invention.

Having thus fully described my invention, what I claim as new, and desire to secure by Letters Patent, is—

1. The combination, with a circulating system B, of a flexible fluid-conducting pipe connected in said circulating system and adapted to be moved laterally by its expansion and contraction, a substantially rigid support in proximity to the pipe, a plate movably mounted on the support, and a movable connection between said pipe and plate, whereby the position of the plate is varied as the pipe moves laterally, substantially as described.

2. In a regulator, the combination of a pair of stationary supports, a fluid-conducting pipe having its opposite ends secured to said supports and its central portion free to move laterally, a substantially rigid support in proximity to the pipe, a plate movably mounted on the latter support, and a connection between said plate and the central portion of said pipe, substantially as and for the purpose set forth.

3. In a regulator, the combination of a pair of stationary supports, a fluid-conducting pipe having its opposite ends secured to said supports and its central portion free to move laterally, a substantially rigid support in proximity to the pipe, a plate movably mounted on the latter support, a collar movably mounted on the central portion of said pipe, and a link between the collar and the movable plate, substantially as and for the purpose specified.

4. In combination, a pair of supports, a fluid-conducting pipe adapted to permit the passage of fluids therethrough, supported at its opposite extremities by said supports, whereby its central portion is free to move laterally when the pipe is expanded or contracted by the temperature of the fluid, a hollow support between the former supports, formed with openings at its opposite extremities for permitting the passage of air therethrough, a movable plate mounted on the latter support, and a connection between said plate and the central portion of said pipe, whereby the position of the plate is varied as the pipe moves laterally, substantially as and for the purpose described.

5. In combination, a pair of supports having a central and two lateral passages, fluid-conducting pipes between the corresponding lateral passages of the heads, having their central portion adapted to move laterally, a central substantially rigid support between the former supports, a movable plate on the latter support, and connections between the central portions of said pipes and said plate, whereby the position of the plate is varied as the pipes move laterally, substantially as and for the purpose specified.

6. In combination, a pair of supports having a central and two lateral passages, fluid-conducting pipes between the corresponding lateral passages of the heads, having their central portions adapted to move laterally as the temperature of the fluid varies, a central hollow support between the former supports, having openings at its opposite extremities for the passage of air therethrough, a movable plate on the latter support, provided with a weighted arm, collars adjustably mounted on the central portion of the pipes, and links between said collars and plate, whereby the position of the plate is varied as the pipes move outwardly, substantially as and for the purpose set forth.

In testimony whereof I have hereunto signed my name, in the presence of two attesting witnesses, at Rochester, in the county of Monroe, in the State of New York, this 14th day of October, 1891.

EDWARD HAYES.

Witnesses:
   HAMPDEN HYDE,
   GEO. H. HUMPHREY.